(12) United States Patent
Poole

(10) Patent No.: US 7,640,676 B1
(45) Date of Patent: Jan. 5, 2010

(54) POWER TOOL MEASURING DEVICE

(76) Inventor: Gregory Scott Poole, 1218 Millwright La., Matthews, NC (US) 28104

( * ) Notice: Subject to any disclaimer, the term of this patent is extended or adjusted under 35 U.S.C. 154(b) by 483 days.

(21) Appl. No.: 11/544,393

(22) Filed: Oct. 6, 2006

(51) Int. Cl.
*B23Q 15/00* (2006.01)
(52) U.S. Cl. .................. 33/630; 33/628; 83/74
(58) Field of Classification Search ........... 33/628, 33/630, 633, 1 M; 83/477.2, 34, 74
See application file for complete search history.

(56) References Cited

U.S. PATENT DOCUMENTS

| | | | | |
|---|---|---|---|---|
| 3,811,353 A | * | 5/1974 | Miles | 83/75.5 |
| 3,910,142 A | * | 10/1975 | Jureit et al. | 83/74 |
| 5,111,688 A | * | 5/1992 | Houghton et al. | 73/159 |
| 5,327,653 A | * | 7/1994 | Pistorius et al. | 33/1 M |
| 7,036,411 B1 | * | 5/2006 | Harris et al. | 83/34 |
| 7,231,858 B2 | * | 6/2007 | Oberheim | 83/477.2 |
| 2007/0157782 A1 | * | 7/2007 | Hetcher et al. | 83/471.3 |

* cited by examiner

*Primary Examiner*—G. Bradley Bennett
*Assistant Examiner*—Tania C Courson
(74) *Attorney, Agent, or Firm*—Summa, Additon & Ashe, P.A.

(57) ABSTRACT

In one embodiment of the present invention, a distance measuring device for use with a power tool having an alignment area for receiving a work piece, comprises a measuring sensor proximate to said alignment area that produces a first signal corresponding to longitudinal motion of the work piece within the alignment area; a processor that receives the first signal, determines a longitudinal distance traveled by the work piece within the alignment area from the first signal, and outputs a second signal corresponding to the longitudinal distance traveled by said work piece within said alignment area; and a display receiving the second signal from the processor and providing an alpha-numeric representation of the distance traveled by the work piece within the alignment area.

26 Claims, 14 Drawing Sheets

POWER TOOL MEASURING DEVICE

FIELD OF THE INVENTION

The present invention relates to power tools and, in particular, to a measuring device for improving an operator's speed and accuracy when using the power tool.

BACKGROUND OF THE INVENTION

Conventional power tools, such as miter saws, routers, drill presses and the like, offer a distinct advantage over manually operated tools because they can enhance an operator's precision, accuracy, and efficiency while simultaneously reducing the amount of physical labor required of the operator. As a result, the operator may focus his effort on properly laying out and executing the work to be performed on the work piece. In carpentry, woodworking, metal working and pipe fitting, a power tool operator often lays out the work to be performed on a work piece by using a standard measuring tape to determine the location where the power tool must be applied. After measuring the proper position to apply the power tool, the operator scribes a mark on the work piece with a pencil, pen, marker or other marking tool and then loads the work piece on the power tool to cut or drill into the work piece at the marked position.

Standard measuring tapes are marked in 1/16 inch graduations; however, in precision carpentry, such as cabinetry and furniture making, the 1/16 inch graduations on standard measuring tapes often do not offer an acceptable level of precision, and the carpenter must "eyeball" the measurement when the required distance falls between 1/16 inch graduations. Marking the work piece also inserts a level of imprecision because the operator must account for the thickness of the pencil led or scribing tool when sawing, drilling or routing the work piece. Additionally, when using a saw, the operator must account for the kerf of the saw blade and choose which side of the mark to cut so that the saw blade kerf will not remove too much material from the work piece. This process is inefficient as the carpenter must take the time to measure the distance, mark the work piece, and then stow the measuring tape before actually applying the tool. The present invention seeks to increase a power tool operator's precision and efficiency.

SUMMARY OF THE INVENTION

The present invention recognizes and addresses considerations of prior art constructions and methods.

In one embodiment of the present invention, a distance measuring device for use with a power tool having an alignment area for receiving a work piece comprises a measuring sensor proximate to said alignment area that produces a first signal corresponding to longitudinal motion of the work piece within the alignment area; a processor that receives the first signal, determines a longitudinal distance traveled by the work piece within the alignment area from the first signal, and outputs a second signal corresponding to the longitudinal distance traveled by said work piece within said alignment area; and a display receiving the second signal from the processor and providing an alpha-numeric representation of the distance traveled by the work piece within the alignment area.

In another embodiment of the present invention, a distance measuring device for use with a power tool having an alignment area for receiving a work piece comprises an electronic rotary encoder located proximate to the alignment area having an input shaft and producing a first signal corresponding to longitudinal motion of the work piece within the alignment area; a distance measuring wheel fixed on said electronic rotary encoder input shaft and having an outer circumferential surface in rolling engagement with an outer surface of the work piece; a processor that receives the first signal, determines a longitudinal distance traveled by said work piece within said alignment area from said first signal, and outputs a second signal that corresponds to the longitudinal distance traveled by the work piece within the alignment area; and an electronic digital display receiving the second signal from said processor and providing an alpha-numeric representation of the distance traveled by the work piece within the alignment area.

In yet another embodiment of the present invention, a power tool having an alignment has a distance measuring device comprises: a measuring sensor proximate to the power tool alignment area that produces a first signal corresponding to longitudinal motion of the work piece within said alignment area; a processor that receives the first signal, determines a longitudinal distance traveled by the work piece within the alignment area from the first signal, and outputs a second signal that corresponds to the longitudinal distance traveled by the work piece; and a display receiving the second signal from the processor and providing an alpha-numeric representation of the distance traveled by said work piece within alignment area.

In still another embodiment of the present invention, a power tool comprises: a base; an alignment fence; an alignment area defined by said power tool base and said power tool alignment fence for receiving a work piece; and a distance measuring device having an electronic rotary encoder with an input shaft proximate to said alignment area and producing a first signal that corresponds to a longitudinal motion of the work piece within the alignment area; a distance measuring wheel fixed on the electronic rotary encoder input shaft and having an outer circumferential surface in rolling engagement with an outer surface of said work piece; a processor that receives the first signal, determines the longitudinal distance traveled by the work piece within the alignment area from the first signal, and outputs a second signal that corresponds to the longitudinal distance traveled by the work piece within said alignment area; and an electronic digital display receiving the second signal from the processor and providing an alpha-numeric representation of the distance traveled by the work piece within the alignment area.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
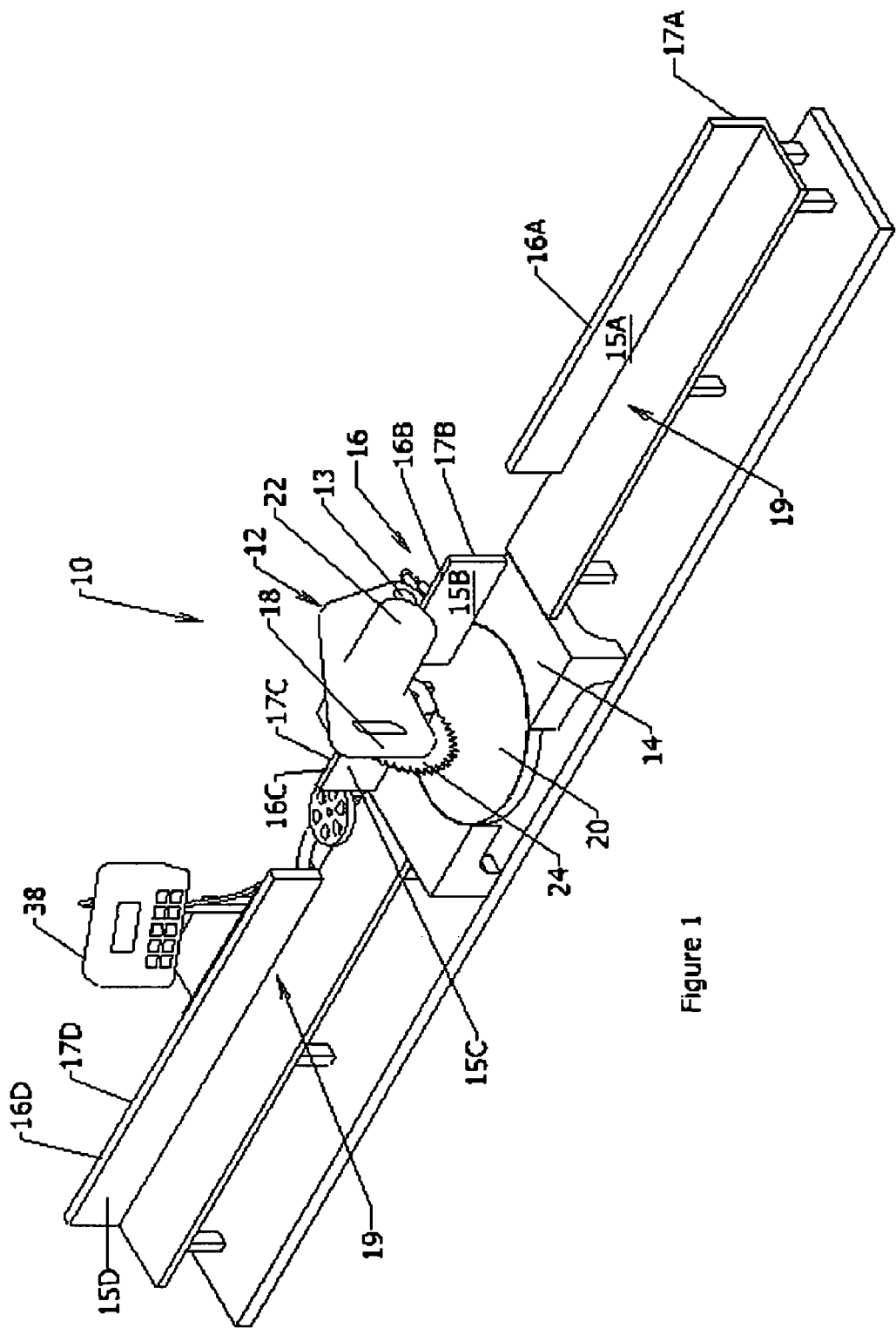
FIG. 1 is a front perspective view of a power tool measuring device in accordance with the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
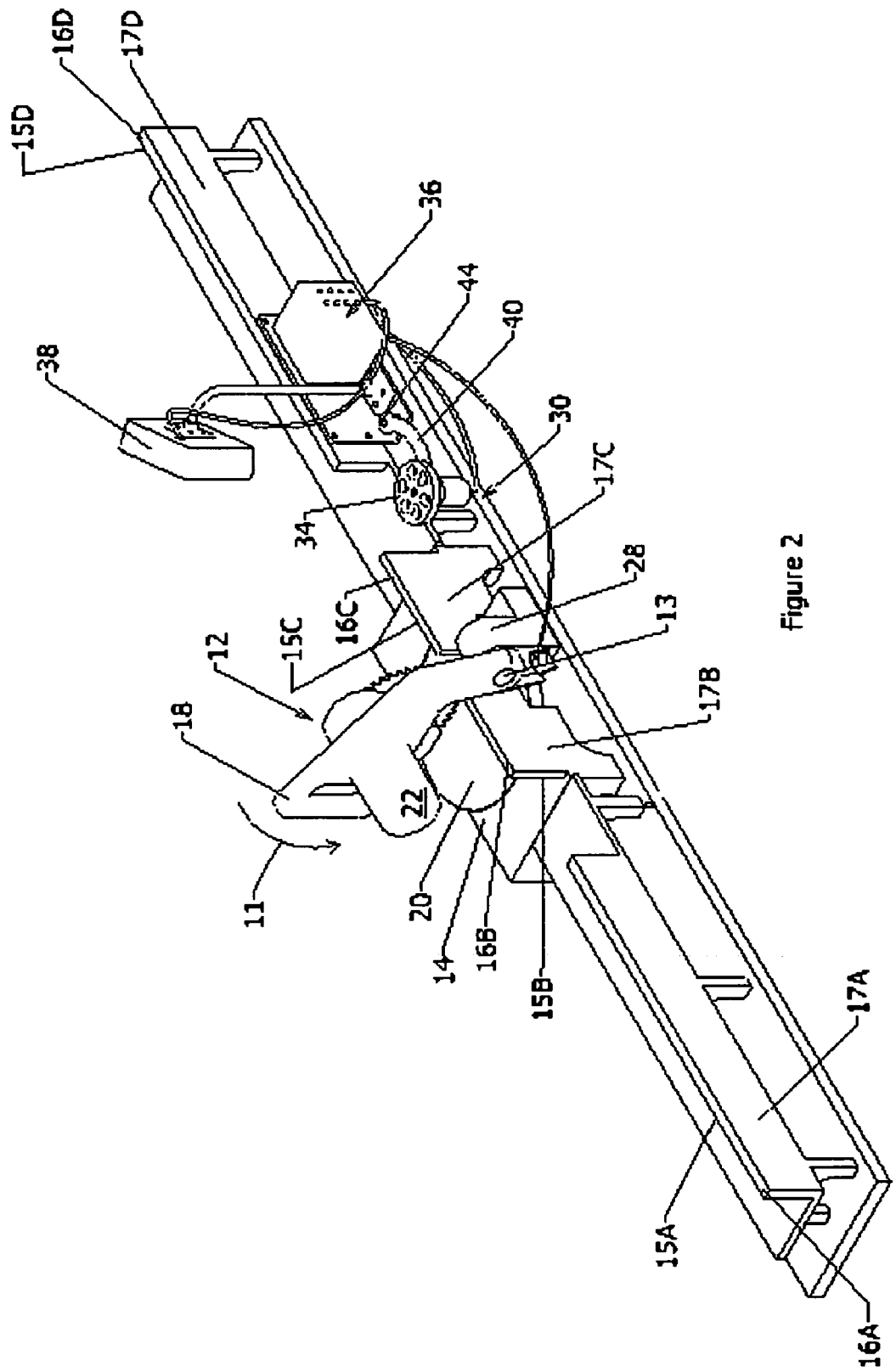
FIG. 2 is a rear perspective view of the power tool measuring device as shown in FIG. 1.

Referring to FIGS. 1 and 2, an embodiment of power tool measuring device 10 of the present invention is shown configured for use with a standard miter saw 12 equipped with a base 14 having an alignment fence 16 that extends vertically from the base. In the present embodiment, measuring device 10 is used with a miter saw, but it should be understood that the measuring device may be used in conjunction with any power tool having an alignment fence, such as a drill press, a router table, or other similar tool. Miter saw 12 preferably has a base 14, an alignment fence 16, a handle assembly 18 and a selectively rotatable table 20. A handle assembly 18 supports a motor 22 with an output shaft 21 (FIG. 4) that is rotationally fixed to a saw blade 24. Handle assembly 18 is pivotally connected to a table 20 by a pivot pin 13 received in a support hub 28 (FIG. 2) that extends vertically from the rear of table 20. A torsional handle spring (not shown) biases handle assembly 18 towards an upright position such that handle assembly will only rotate downward in the direction of arrow 11 (FIG. 2) when the operator applies a downward force on the handle assembly.

In one embodiment, fence 16 has multiple sections 16A, 16B, 16C, and 16D, although it should be understood that fence 16 may also be a single section spanning the entire length of miter saw base 14. Each fence section 16A, 16B, 16C, and 16D has a respective forward facing surface 15A, 15B, 15C, and 15D, and a respective rearward facing surface 17A, 17B, 17C, and 17D. The forward facing surfaces of the fence sections define an alignment area 19 (FIG. 1) that allows the saw operator to properly align a work piece (not shown) and slide the work piece longitudinally until the work piece is properly positioned for cutting.

Figure 3:
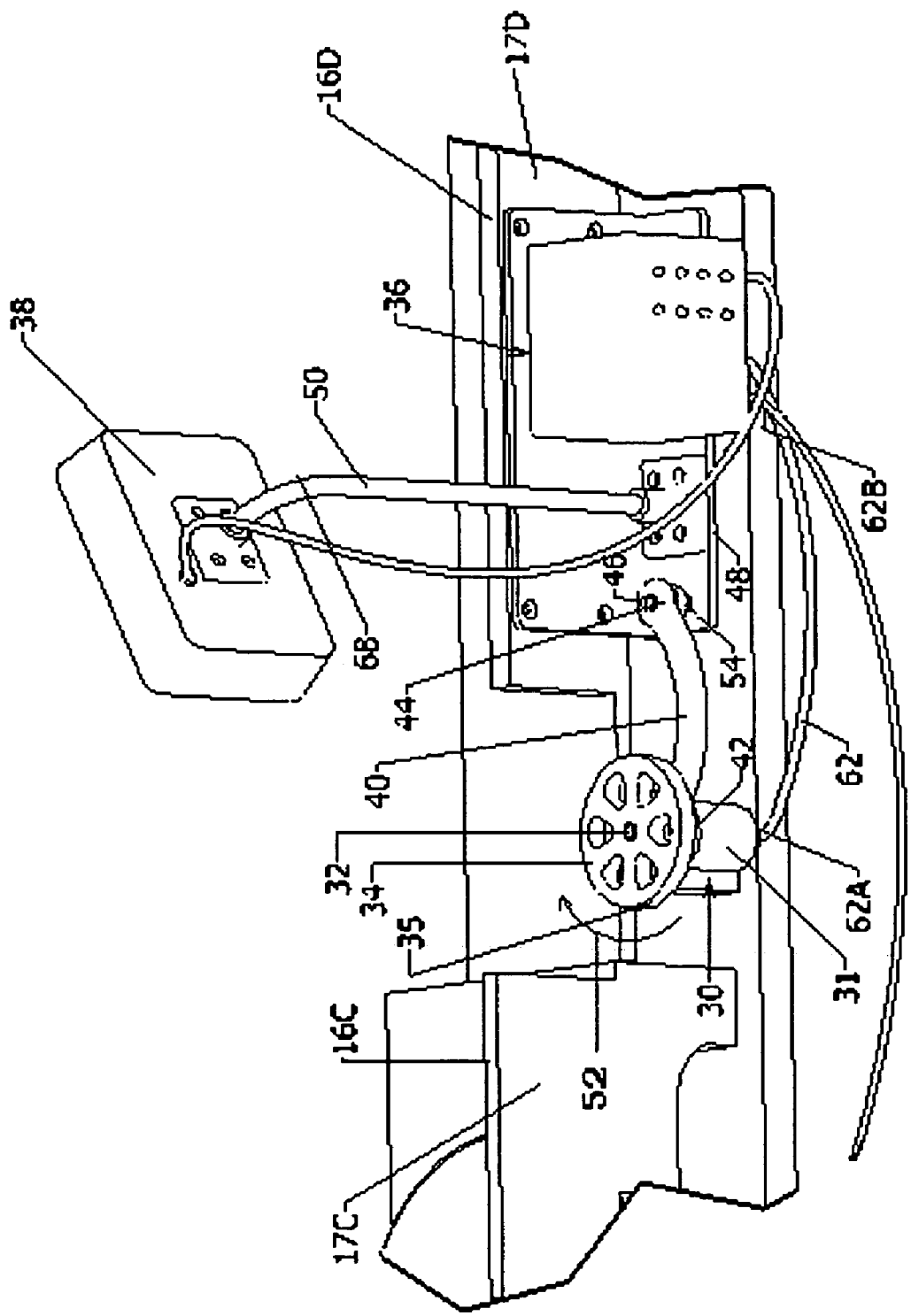
FIG. 3 is a rear view of the power tool measuring device as shown in FIG. 1.

Referring to FIGS. 2 and 3, measuring device 10 includes a measuring sensor 30 (in this embodiment a rotary encoder) having an input shaft 32 (FIG. 3), a measuring wheel 34, a processor 36, and a display 38. Referring specifically to FIG. 3, a pivot arm 40 defines a first end 42 that supports measuring sensor 30 and a second end 44 that is pivotally attached to a pivot post 46. The pivot post extends vertically from a support bracket 48 that is rigidly mounted to rearward facing surface 17D of alignment fence section 16D. Support bracket 48 provides rigid support to processor 36 and display 38 by means of a display support member 50. Support bracket 48 is positioned so that measuring wheel 34 is disposed between alignment fence sections 16C and 16D.

In a preferred embodiment, pivot arm 40 is biased by a torsion spring 54 that surrounds pivot post 46 and has a first end (not shown) rigidly attached to pivot arm second end 44 and a second end (not shown) rigidly attached to support bracket 48. A torsion load is applied to torsion spring 54 during assembly such that the engagement between torsion spring second end (not shown) and support bracket 48 biases torsion spring first end (not shown) in a manner that urges pivot arm first end 42 in the direction of arrow 52 so that measuring wheel circumferential surface 35 extends into alignment area 19. In a preferred embodiment, torsion spring 54 is selected to have a spring constant small enough to allow pivot arm 40 and measuring wheel 34 to articulate in the direction opposite to arrow 52 when measuring wheel circumferential surface 35 encounters the edge of a work piece. However, torsion spring 54 should be strong enough that it urges measuring wheel 34 into continuous rolling engagement with the edge of the work piece as the work piece is maneuvered longitudinally within alignment area 19 (FIGS. 1 and 2). It should be understood that any suitable biasing element may be substituted for the torsion spring, such as a linear compression spring, a hydraulic cylinder, or other similar device.

As previously mentioned, measuring sensor 30 has an input shaft 32 that is fixed to measuring wheel 34 so that the input shaft and the measuring wheel rotate in unison. Preferably, measuring sensor 30 is an electronic rotary encoder 31 that generates signal pulses as input shaft 32 rotates as described in further detail below. While the operation of rotary encoder 31 is not considered part of the invention, one of skill in the art should be familiar with their operation and recognize a suitable example of such an encoder to be the Allen-Bradley 845P Size 15 Incremental Encoder. The signal pulses are transmitted from rotary encoder 31 to processor 36 by means of a first communication cable 62. Communication cable 62 has a first end 62A received by a rotary encoder output port 60 and a second end 62B received by processor 36. In a preferred embodiment, processor 36 is a central processing unit (CPU) (not shown) equipped with a microprocessor, integrated counting circuit, or electronic analog circuit programmed to interpret the pulses generated by rotary encoder 31 as signaling a linear distance. The CPU transmits information, including the processed signal pulses, through a second communications cable 68 to display 38. While measuring device 30 is described in detail as a rotary encoder, it should be understood that any suitable rotation motion measuring device, such as a mechanical click-wheel, a linear encoder, or other similar device may be used.

Processor 36 transmits output information to display 38 so that the operator may read and interpret the measurements taken by measuring device 30. In a preferred embodiment, display 38 is a digital display that shows the operator an alpha-numeric representation of the length that the work piece has moved longitudinally within alignment area 19 (FIGS. 1 and 2). Display 38 may also be equipped with an input keypad 75 (FIGS. 4 and 6) that the operator may use to input information to CPU 37, such as the kerf of a newly installed saw blade. The operator may also use keypad 75 (FIGS. 4 and 6) to direct the CPU to display the displacement of the work piece in English or Metric units or manually override the CPU functions.

Figure 4:
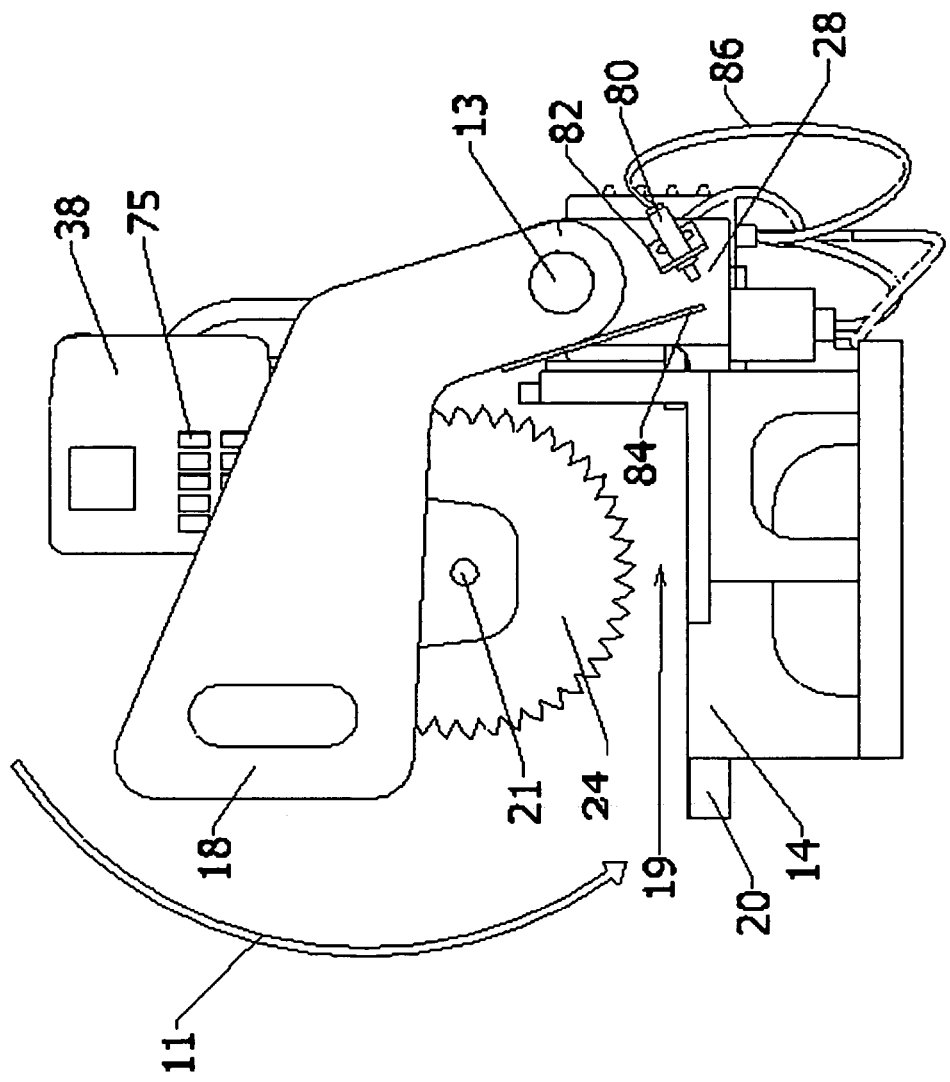
FIG. 4 is a side view of the power tool measuring device as shown in FIG. 1.
Figure 5A:
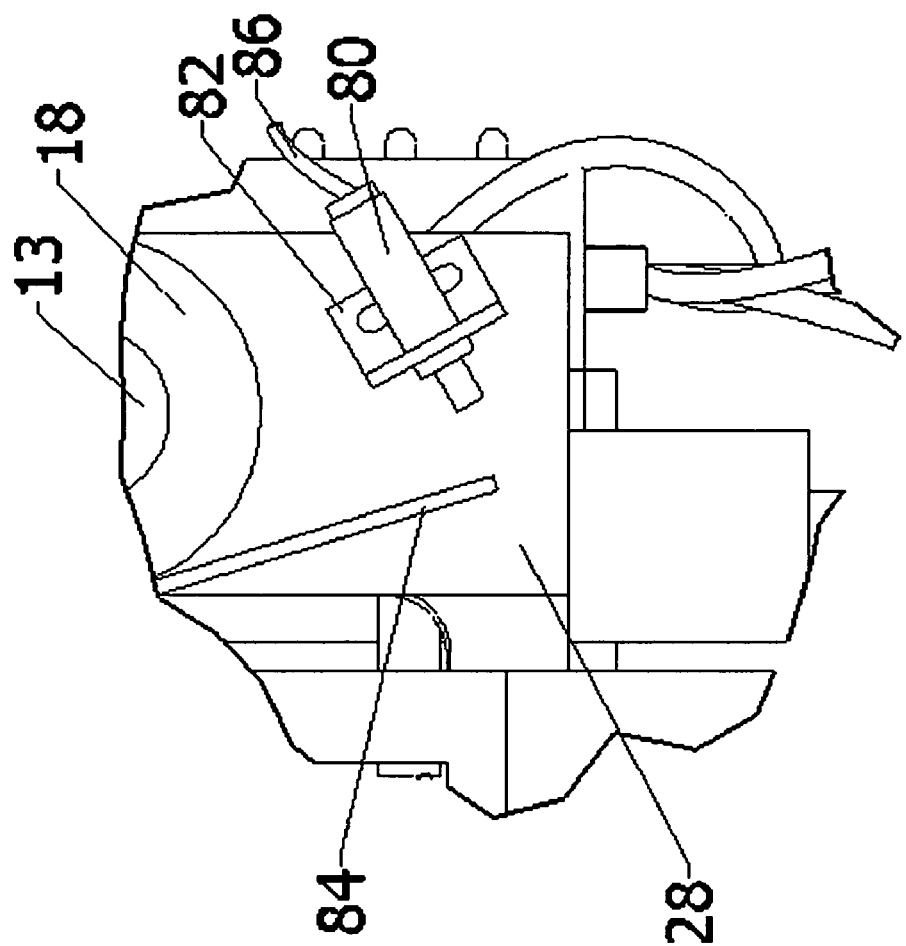
FIG. 5A is an enlarged side view of the power tool measuring device as shown in FIG. 1.
Figure 5B:
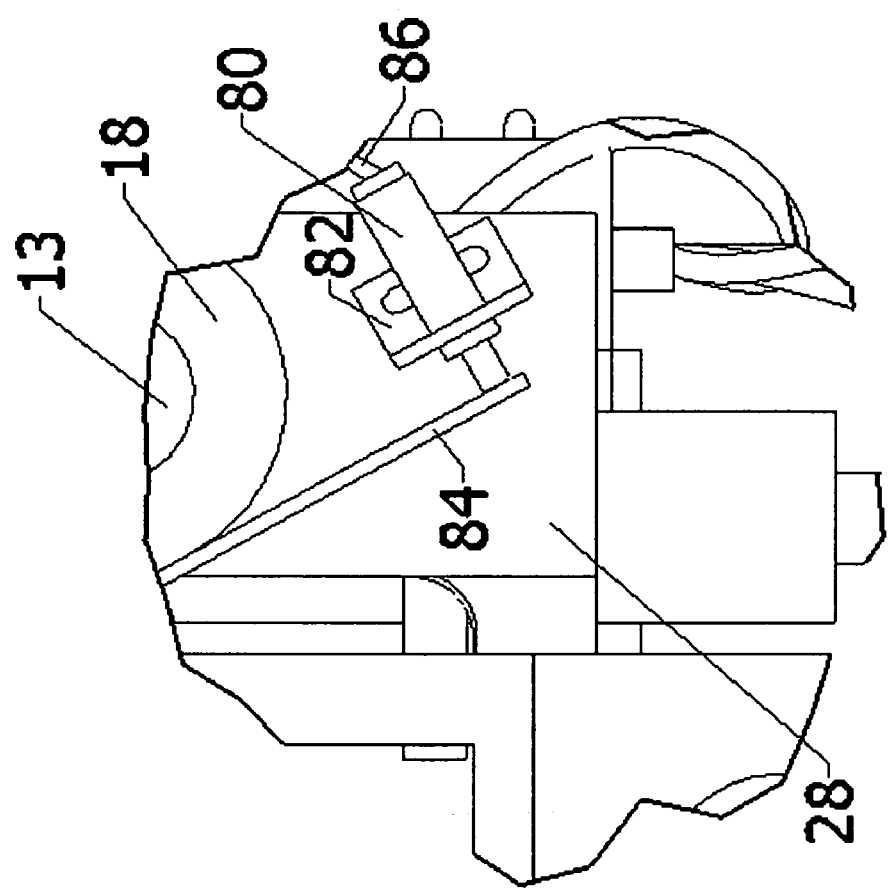
FIG. 5B is an enlarged side view of the power tool measuring device as shown in FIG. 1.

Referring to FIGS. 4, 5A and 5B, a proximity switch 80, which may be an optical sensor, a magnetic sensor, or other similar sensing device, is fixed to a bracket 82 mounted on support hub 28. Handle assembly 18 supports a flag 84 mounted proximate to pivot pin 13 so that proximity switch 80 may selectively sense the presence of flag 84. When saw handle assembly 18 is in its normal position, as shown in FIGS. 4 and 5A, the distance between flag 84 and proximity switch is great enough to prevent the switch from sensing the flag's presence. However, when the operator rotates the handle assembly into the cutting position, flag 84 moves into a position where proximity switch 80 can easily sense the flag's presence, as shown in FIG. 5B. The proximity switch then generates a signal indicating that the saw handle assembly is in the cutting position, and the output signal from proximity switch 80 is transmitted to CPU 37 (FIG. 2) by a communication cable 86, as discussed in further detail below.

Figure 6:
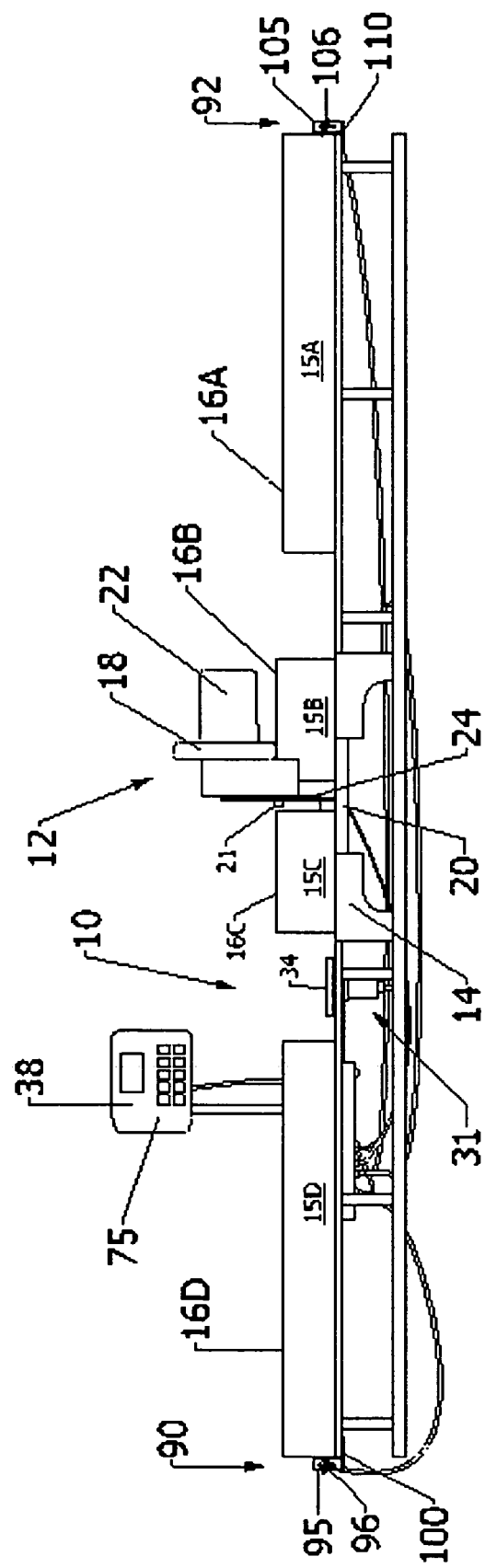
FIG. 6 is a front edge view of a second embodiment of power tool measuring device in accordance with the present invention.
Figure 7:
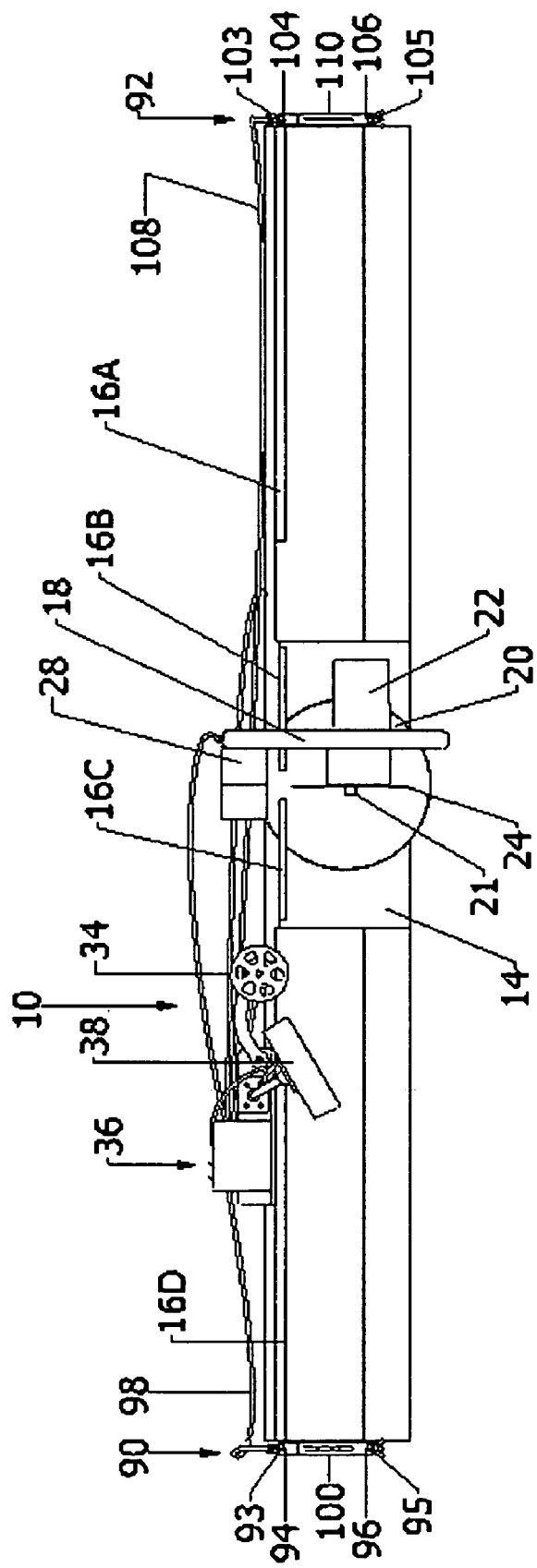
FIG. 7 is a top edge view of the power tool measuring device as shown in FIG. 6.

Referring to FIGS. 6 and 7, and embodiment of the power tool measuring device 10 having a first deployable stop 90 and an optional second deployable stop 92. First deployable stop 90 and optional second deployable stop 92 perform the function of sending an indication signal to the CPU when a work piece has been loaded onto the power tool base as described in detail below. In a preferred embodiment, and as discussed below, first deployable stop 90 is a standard through-beam photoelectric sensor having an emitter 94 (FIGS. 7 and 8), a reflector 96, and a communications cable 98 that relays the signal produced by emitter 94 to CPU 37 (FIG. 7). Emitter 94 produces an infrared light beam that is focused on reflector 96. When no objects is placed between emitter 94 and reflector 96, the light beam is reflected by the reflector and returns to the emitter, which receives the light beam and sends a continuous signal to the CPU. If an object is placed between the emitter and the reflector, the light beam is not reflected to the emitter, and the emitter no longer sends a signal to the CPU. The CPU interprets the condition where no signal is sent from first deployable stop 90 as an indication that a work piece has been loaded on the left-hand side of power tool 12. While deployable stop 90 is preferably a standard through-beam photoelectric sensor, any suitable sensor may be substituted, such as a diffuse reflective photoelectric sensor, a polarized reflex photoelectric sensor, or a mechanical gate-type sensor.

Figure 8:
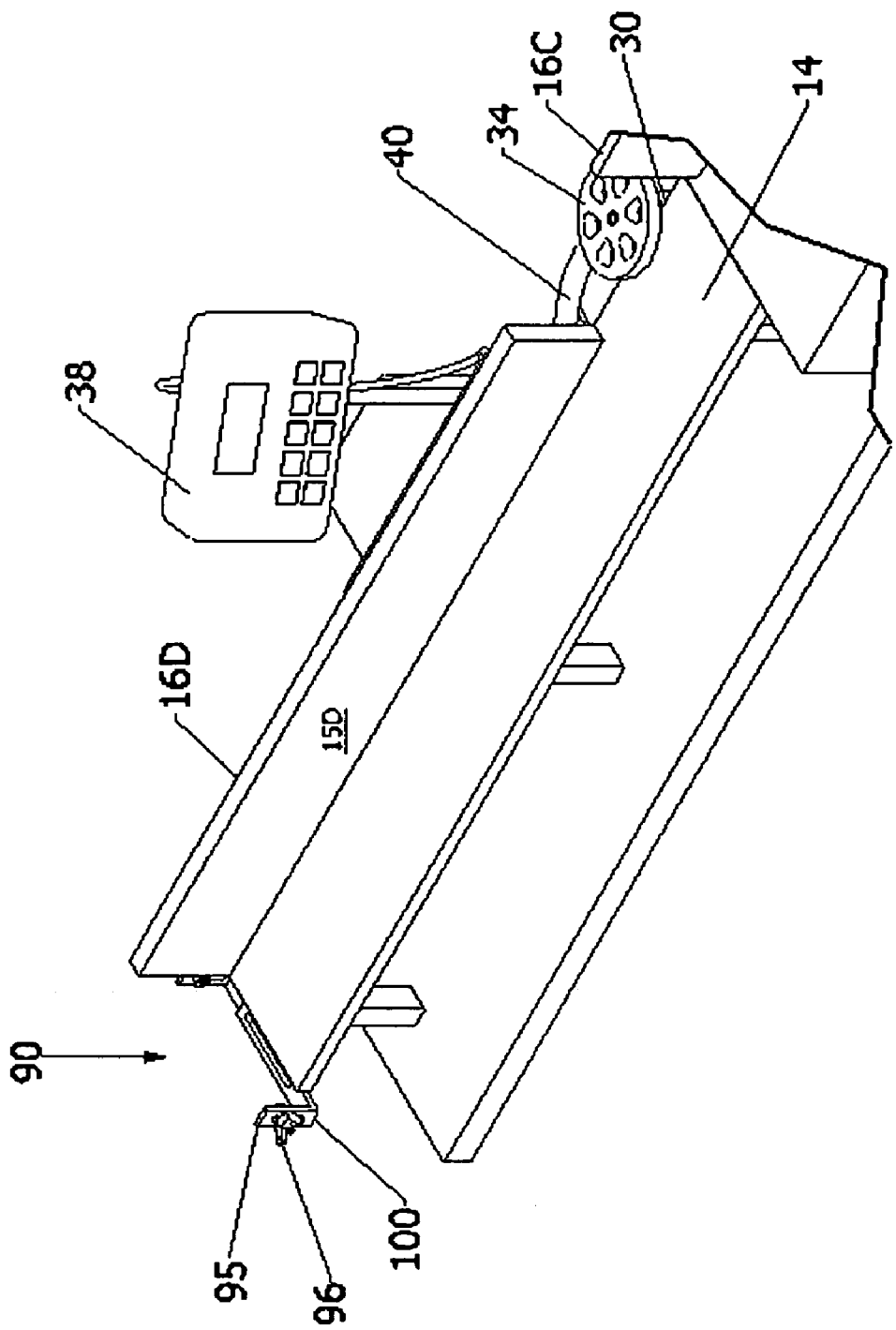
FIG. 8 is an enlarged front perspective view of the power tool measuring device as shown in FIG. 6.

Referring to FIGS. 7 and 8, a first mounting bracket 100 preferably provides rigid support to first deployable stop 90 and has a first arm 93 that supports emitter 94 and a second arm 95 that supports reflector 96. First mounting bracket 100 is rigidly attached to the underside of power tool base 14 proximate to alignment fence section 16D.

Figure 9:
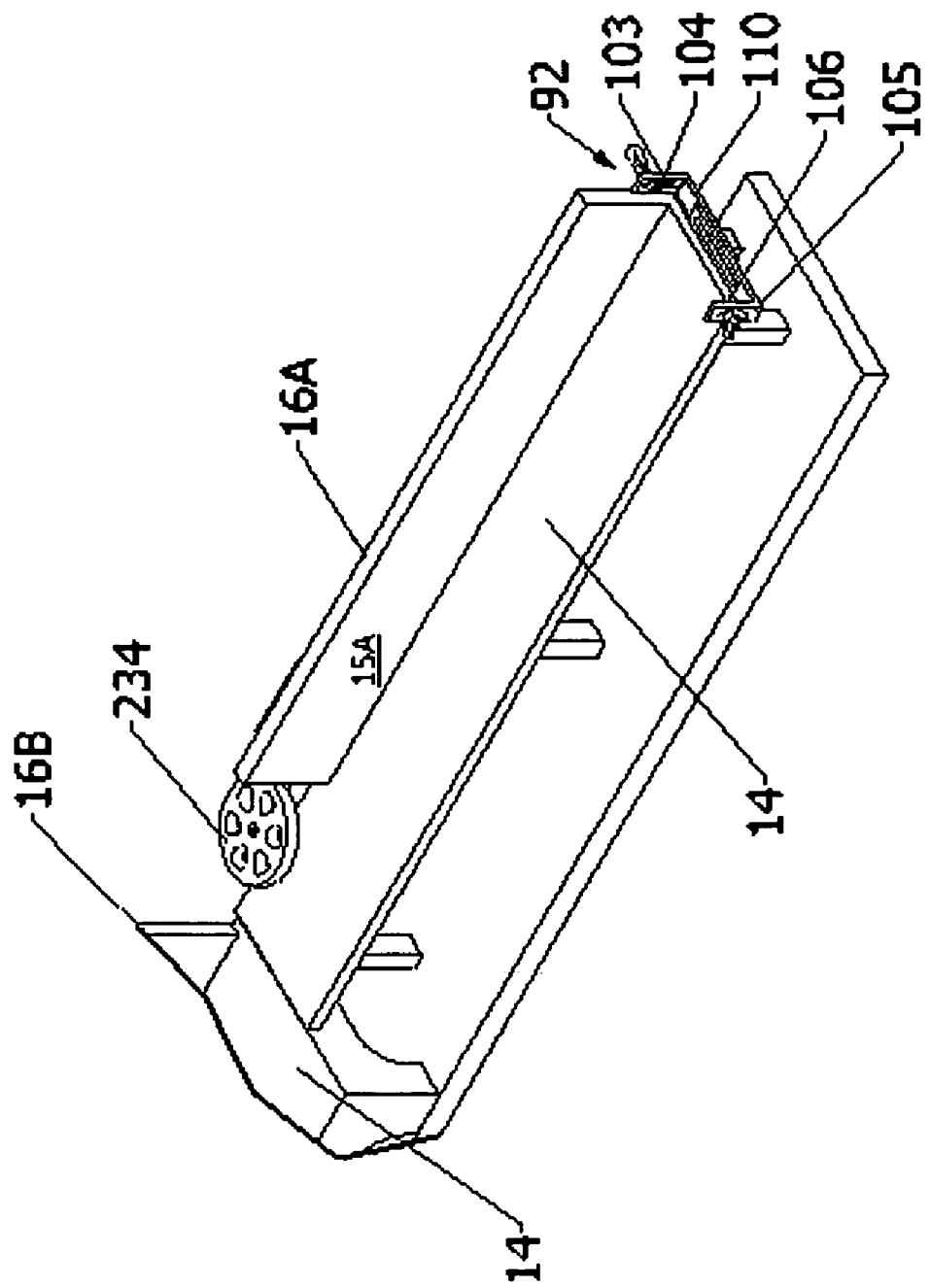
FIG. 9 is an enlarged front perspective view of the power tool measuring device as shown in FIG. 6.

Referring now to FIGS. 6, 7, and 9, optional second deployable stop 92 is preferably also a standard through-beam photoelectric sensor that operates identically to the sensor described above in accordance with the first deployable stop. Optional second deployable stop 92 has an emitter 104 (FIGS. 7 and 9), a reflector 106, and a communications cable 108 that relays the signal produced by emitter 104 to CPU 37 (FIG. 7). Emitter 104 produces an infrared light beam that is focused on reflector 106. Under normal operation, the light beam is reflected by the reflector and returns to the emitter, which receives the light beam and sends a continuous signal to the CPU; however, if an object is placed between emitter 104 and reflector 106, the light beam is not reflected to the emitter, and the emitter no longer sends a signal to the CPU. The CPU interprets the condition where no signal is sent from optional second deployable stop 92 as an indication that a work piece has been loaded on the right-hand side of power tool 12. It should be understood that any suitable sensor may be substituted for emitter 104 and reflector 106, such as a diffuse reflective photoelectric sensor, a polarized reflex photoelectric sensor, or a mechanical gate-type sensor.

Referring specifically to FIGS. 7 and 9, a second mounting bracket 110 preferably provides rigid support to optional second deployable stop 92, and has a first arm 103 that supports emitter 104 and a second arm 105 that supports reflector 106. Second mounting bracket 110 is rigidly attached to the underside of power tool base 14 proximate to alignment fence section 16A.

Figure 10:
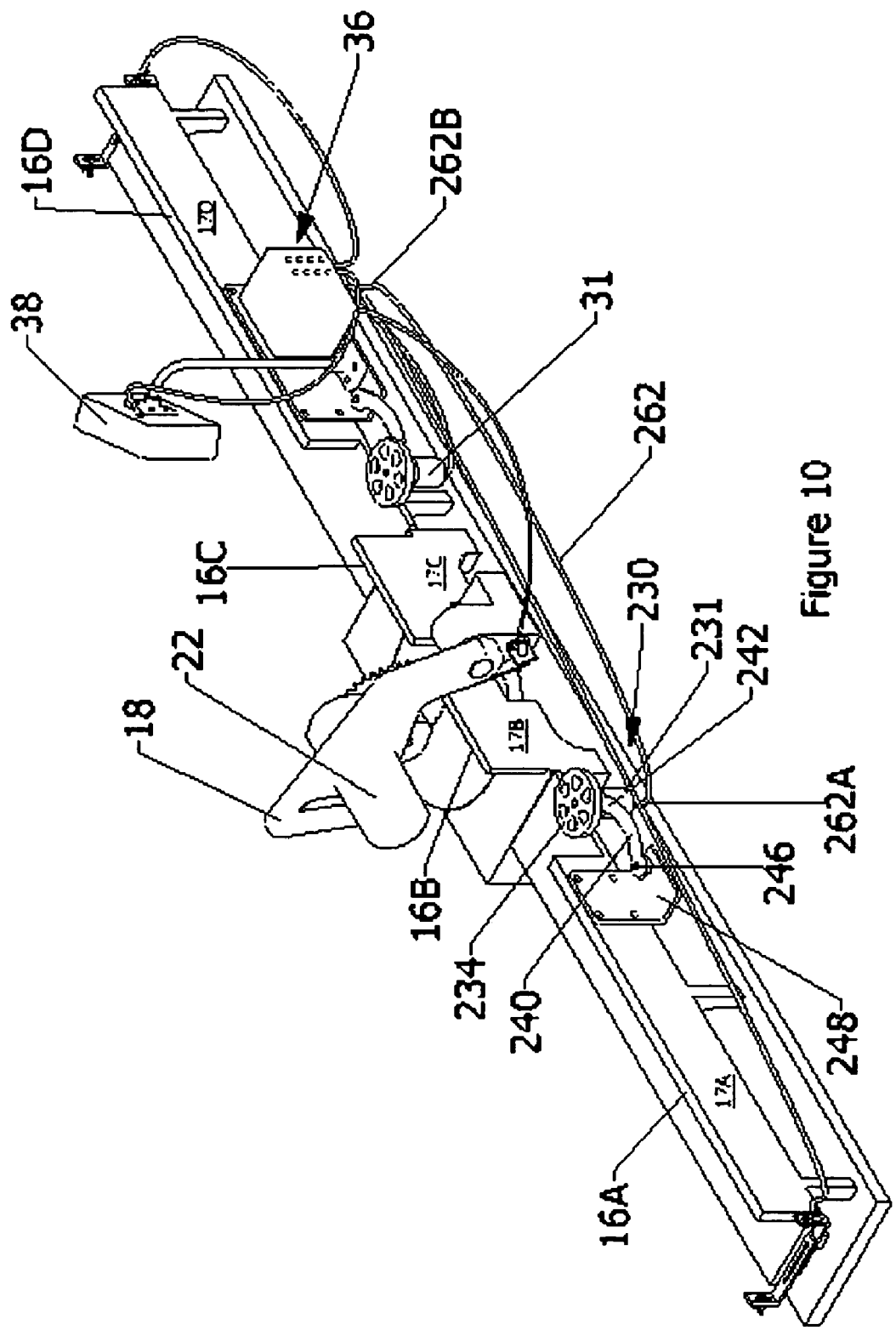
FIG. 10 is a rear perspective view of a third embodiment of the power tool measuring device in accordance with the present invention.
Figure 11:
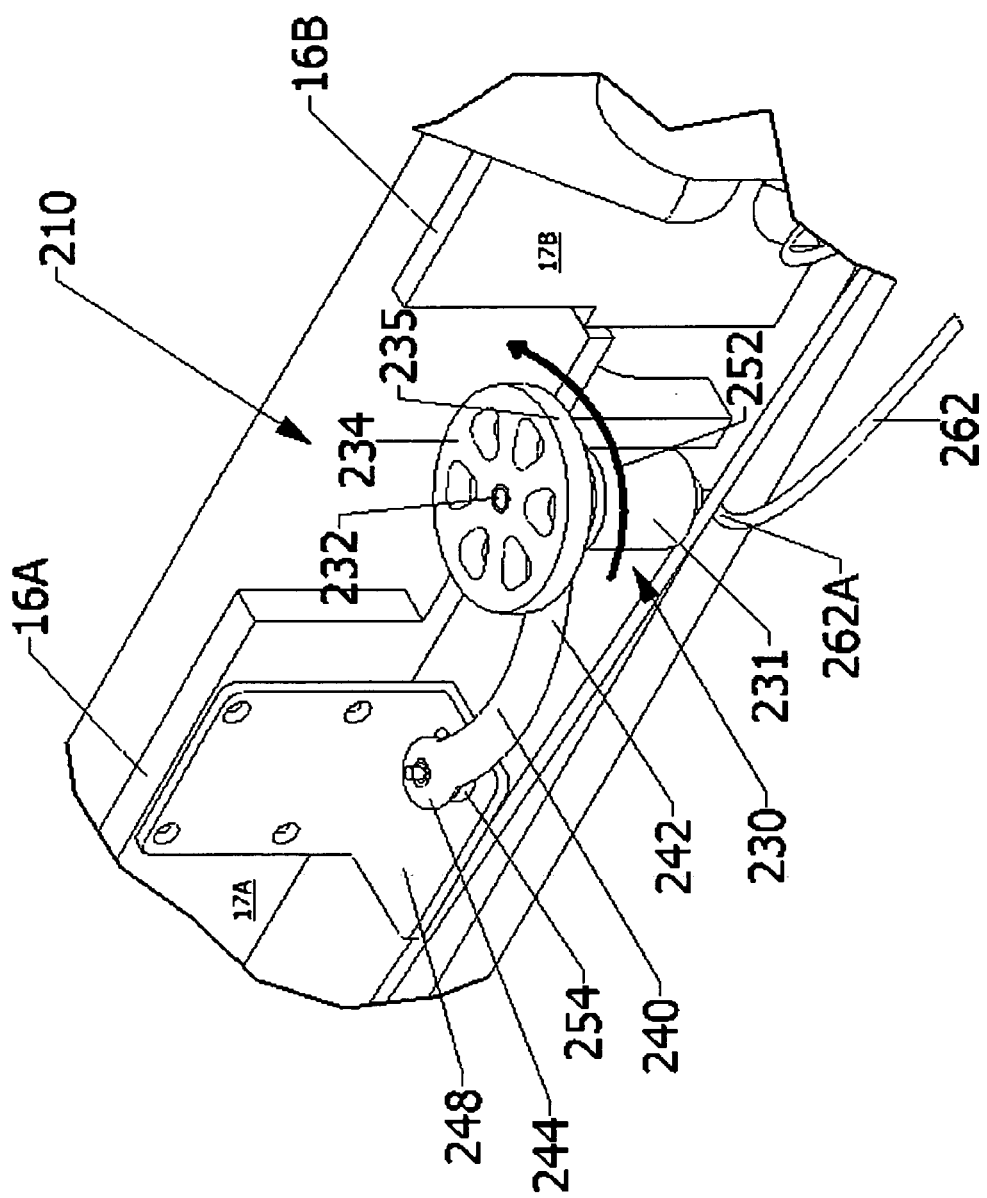
FIG. 11 is an enlarged front perspective view of the power tool measuring device as shown in FIG. 10.

Referring to FIGS. 10 and 11, an embodiment of a power tool measuring device has an optional second measuring device 210 that is similar to measuring device 10 discussed above. Second measuring device 210 has a sensor 230 with an input shaft 232 (FIG. 11), a measuring wheel 234 with an outer circumferential surface 235, and a second a pivot arm 240. The second pivot arm 240 has a first end 242 that supports measuring sensor 230 and a second end 244 that is pivotally attached to a pivot post 246. The pivot post extends vertically from a support bracket 248 rigidly mounted to alignment fence rearward facing surface 17A. The support bracket is positioned so that measuring wheel 234 is disposed between alignment fence sections 16A and 16B.

Referring to FIG. 11, in a preferred embodiment, pivot arm 240 is biased in a direction represented by arrow 252 by a torsion spring 254. The torsion spring surrounds pivot post 246 and has a first end (not shown) rigidly attached to pivot arm 240 and a second end (not shown) rigidly attached to support bracket 248. A torsion load is applied to torsion spring 254 during assembly such that the engagement between torsion spring second end (not shown) and support bracket 248 biases spring first end (not shown) in a manner that urges pivot arm first end 242 in the direction of arrow 252. The biasing action of torsion spring 254 urges pivot arm first end 242 and measuring wheel 234 into alignment area 19. Preferably, torsion spring 254 is selected to have a spring constant small enough to allow pivot arm 240 and measuring wheel 234 to articulate in the direction opposite to arrow 252 when the outer circumferential surface 235 of measuring wheel 234 encounters the edge of a work piece. However, torsion spring 254 should be strong enough that it urges measuring wheel 234 into continuous rolling engagement with the edge of the work piece as the work piece is maneuvered along longitudinal axis 19A (FIG. 19A). It should be understood that any suitable biasing element may be substituted for the torsion spring, such as a linear compression spring, a hydraulic cylinder, or some other similar device.

Second pivot arm first end 242 supports second sensor 230, which is preferably a digital rotary encoder 231. Measuring wheel 234 is fixed to rotary encoder input shaft 232 so that the measuring wheel and the input shaft rotate in unison. As input shaft 232 rotates, rotary encoder 231 generates signal pulses as described in further detail below. The signal pulses are transmitted from the rotary encoder counting device 231 by a communication cable 262. Preferably, both measuring wheel 234 and rotary encoder 231 be identical in size and resolution to measuring wheel 34 and rotary encoder 31 (FIG. 10), respectively; however it should be understood that measuring wheel 234 and rotary encoder 231 may be of different size and resolution and that rotary encoder 231 or the CPU may be calibrated to account for the differences in measuring wheel size and encoder resolution.

Figure 12:
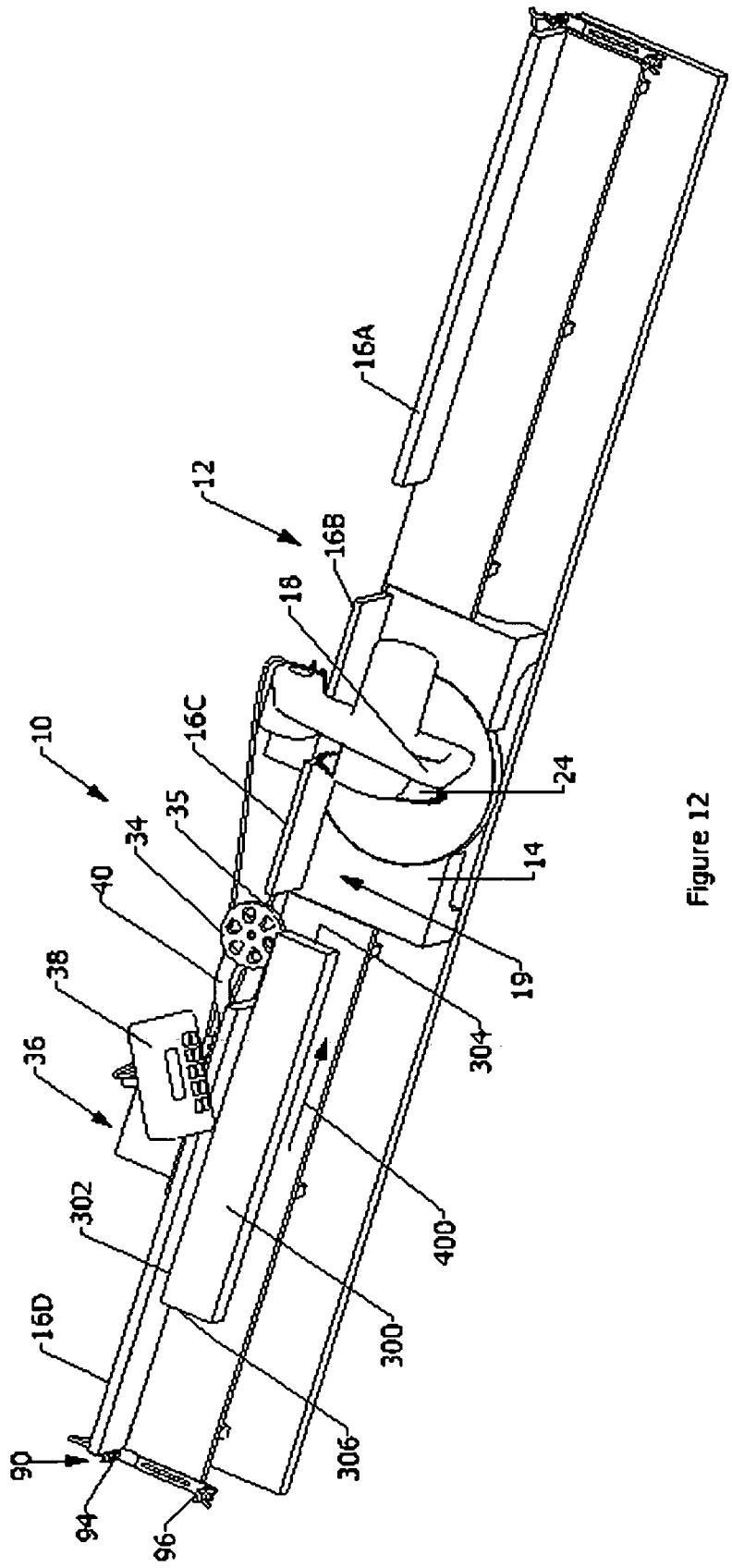
FIG. 12 is a top perspective view of the operation of a power tool measuring device in accordance with the present invention.

In operation of a preferred embodiment of the power tool measuring device 10, and referring to FIG. 12, the operator loads a work piece 300 onto the power tool base 14 such that an edge 302 of the work piece proximate to alignment fence section 16D is positioned flush against the alignment fence forward facing surface 15D. Work piece 300 has an end 304 positioned proximate to the left-hand side of saw blade 24, and an end 306 positioned distal from the left-hand side of the saw blade. As work piece 300 is loaded into alignment area 19, edge 302 comes into contact with the measuring wheel outer circumferential surface 35. To properly align edge 302 with alignment fence section 16D, pivot arm 40 must rotate in a direction opposite of arrow 52 against the bias of torsion spring 54 (FIG. 3). In this way, torsion spring 54 provides resistance against further rotation of pivot arm 40 and ensures that measuring wheel outer circumferential surface 35 remains in constant rolling engagement with work piece edge 302.

When work piece edge 302 is properly positioned against the alignment fence section 16D, deployable stop 90 senses work piece 300 when the work piece passes between the deployable stop's emitter 94 and reflector 96 and breaks the photoelectric beam produced by the emitter and causing the emitter to stop sending its signal to the CPU. The CPU interprets the interruption in the signal from deployable stop 90 to mean that a cutting process is imminent, and that the operator has loaded the work piece on the power tool at a position to the left of the saw blade. Because the presence of the work piece interrupted the signal produced by first deployable stop 90, the CPU chooses to read and process only the output signal generated by rotary encoder 31 (FIG. 3), which will correspond to the longitudinal distance traveled by the work piece in alignment area 19. If the operator is using an embodiment of the power tool measuring device that does not include a first deployable stop 90, the operator may use keypad 75 (FIGS. 4 and 6) provided on display 38 to input information to the CPU that indicates that a work piece has been loaded on the left-hand side of power tool 12 and that the CPU should process cut length information received from rotary encoder 31.

After the CPU recognizes an interruption in the signal from the first deployable stop, the CPU waits for an input signal from handle assembly proximity switch 80. As part of the pre-cut routine, the operator rotates handle assembly 18 in the direction of arrow 11 (FIG. 4) until saw blade 24 is placed in the cutting position. Referring to FIGS. 4 and 5B, once handle assembly 18 is fully rotated into the cutting position, proximity switch 80 senses the presence of flag 84 and sends a signal to the CPU that the handle assembly has been put in the cutting position. Once the CPU receives the signal from proximity switch 80, the CPU resets and holds the display 38 (FIG. 4) so that it shows a cut distance reading of zero. While handle assembly 18 is in the cutting position, the CPU holds the display reading at zero even though rotary encoder may generate output signal pulses because the CPU will recognize that the signal pulses generated by the rotary encoder are the result of the operator moving the work piece to a zero-point location. The operator places the work piece in zero-point location by sliding the work piece 300 along alignment fence 16 in the direction of arrow 400 until work piece end 304 engages the left-hand side of saw blade 24. In this way, the work piece is located such that the zero reading shown on display 38 properly reflects the fact that work piece end 304 is directly adjacent to the saw blade in the zero-point location.

Once the operator places work piece 300 in the zero-point location, the operator then returns handle assembly 18 to its resting position, and proximity switch 80 no longer senses the presence of flag 84, causing an interruption in the signal produced by proximity switch 80. The CPU recognizes the interruption of the signal from proximity switch 80 as an indication that the operator has placed the work piece is the zero-point location and that cut measurement is about to begin. The CPU then actively receives and interprets output signal pulses generated by the rotary encoder. As the operator slides work piece 300 in the direction of arrow 400, the rolling engagement between measuring wheel outer circumferential surface 35 and work piece edge 302 forces rotary encoder input shaft 32 (FIG. 3) to rotate. As the rotary encoder input shaft rotates, output signal pulses are generated by the rotary encoder 31 and transmitted to the CPU. The CPU reads and interprets the pulses from rotary encoder 31 (FIG. 3) and processes the signal pulses from the rotary encoder into a display signal that represents the longitudinal movement of the work piece. The CPU then sends the display signal to display 38, where the signal is shown as a numerical representation of the length the operator has moved work piece from its original zero point location. The rolling engagement between measuring wheel outer circumferential surface 35 and work piece edge 302 forces rotary encoder input shaft 32 (FIG. 3) to rotate in response to movement of work piece edge 302 in direction of arrow 400.

The operation of the rotary encoder will now be described in detail. In a preferred embodiment, rotary encoder 31 generates approximately 360 pulses for each full rotation of measuring wheel 34 and input shaft 31 (FIG. 3). The measuring wheel preferably has a circumference of approximately 11.25 inches so that one full rotation of the measuring wheel corresponds to a work piece displacement of approximately 11.25 inches along longitudinal axis 19A. This combination of rotary encoder resolution and measuring wheel circumference is advantageous because a one-inch linear movement of the work piece along longitudinal axis 19A results in the generation of 32 pulses: that is to say that the rotary encoder generates one pulse for each thirty-second of an inch that work piece 300 moves along axis 19A in the direction of arrow 400. The CPU receives the pulses generated by the rotary encoder, and sums the total number of pulses received from the rotary encoder. In this way, each new pulse received by the CPU is added to the sum of all previously received pulses to create a new sum. The CPU simultaneously stores the new sum, which corresponds to the total distance the work piece has traveled in the direction of arrow 400, and relays the new sum to display 38, where the digital output shows the total cut distance in both full inches and thirty-seconds of an inch. Increasing or decreasing either resolution of rotary encoder 31 or the circumference of measuring wheel 34 will result in a measuring device having a different resolution. For example, using a rotary encoder with a resolution of 90 pulses per input shaft rotation and a measuring wheel with a circumference of 5.625 inches yield a measuring device that generates one pulse for each sixteenth of an inch movement of the work piece. Similarly, a measuring wheel and rotary encoder combination may be selected that will display the cut distance in metric units.

As the operator slides the work piece in the direction of arrow 400, the power tool display 38 provides a precise indication of the cut distance. Once the operator is satisfied that the proper cut distance has been achieved, the operator activates the saw motor, and rotates handle assembly 18 in the direction of arrow 11 (FIG. 4) until the saw blade cuts completely through the work piece. As described above, rotation of the handle assembly into the cutting position causes proximity switch 80 to sense the presence of flag 84 (FIG. 5B) and send a signal to the CPU. The CPU recognizes the signal from proximity switch 80 as indicating that the cutting function is being performed. After the cut has been performed, the operator removes two cut pieces of the work piece from the miter saw 12 and returns handle assembly 18 to its resting position, thus removing flag 84 from proximity switch 80 and interrupting the signal sent from proximity switch 80 to the CPU. The CPU interprets this interruption as an indication that the cutting function has been performed, and the CPU holds the display 38 so that the display shows only distance measurement value shown on the display at the time that proximity switch 80 sensed flag 84 when the cut was performed. In this way, display 38 will continue to show the cut measurement from the prior cut until a new work piece is loaded into the alignment area and the signal from deployable stop 90 is interrupted once again.

Figure 13:
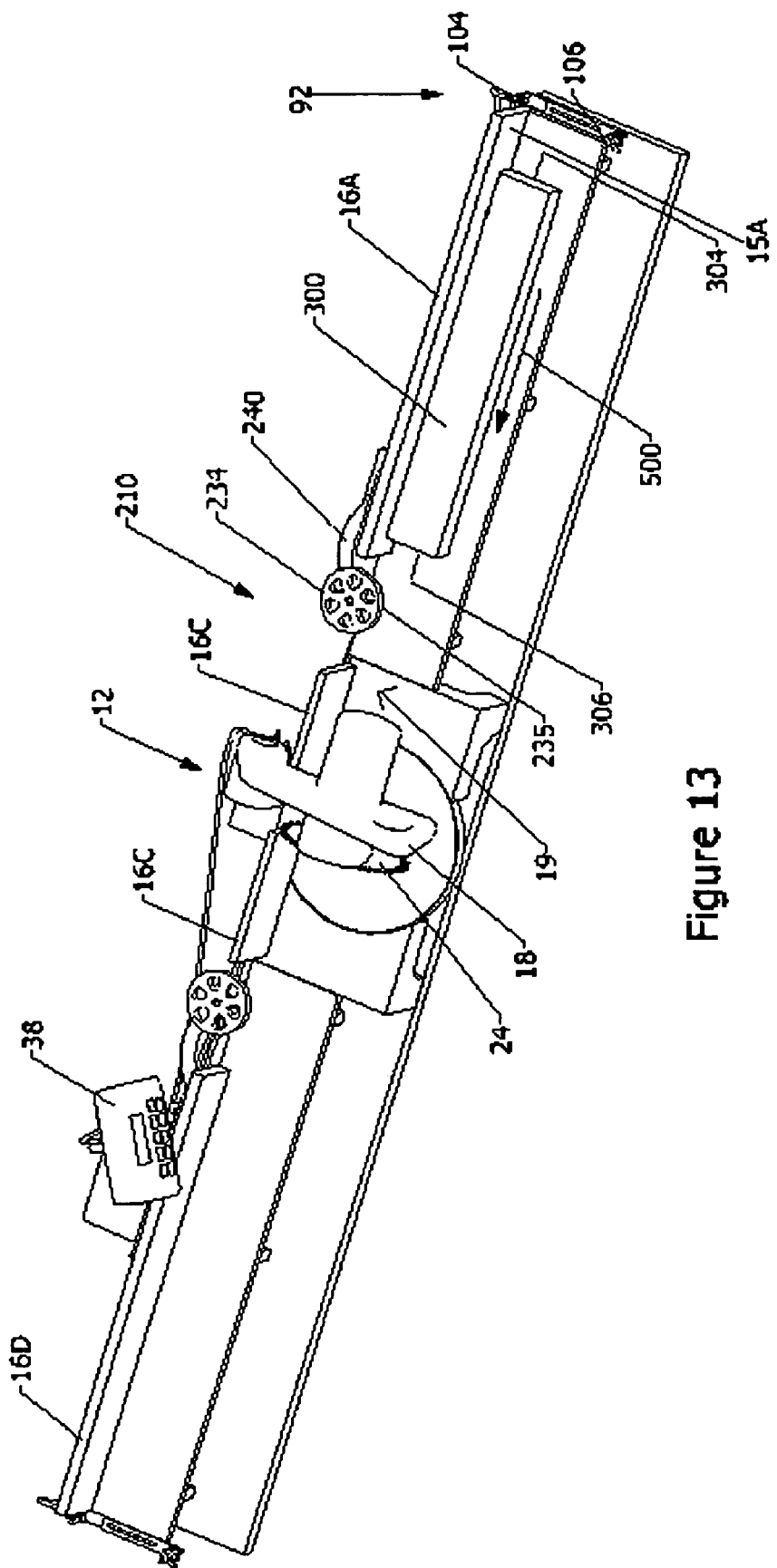
FIG. 13 is a top perspective view of the operation of a power tool measuring device in accordance with the present invention.

Referring to FIG. 13, when the operator is using a power tool measuring device having an optional second measuring device 230, the operator may choose to load work piece 300 onto the power tool base 14 such that edge 302 of the work piece proximate to alignment fence section 16A is positioned flush against the alignment fence forward facing surface 15A. Work piece end 306 is positioned proximate to the right-hand side of saw blade 24, and work piece end 304 is positioned distal from the right-hand side of the saw blade. As work piece 300 is loaded into alignment area 19, edge 302 comes into contact with the measuring wheel outer circumferential surface 235. To properly align edge 302 with alignment fence section 16A, pivot arm 240 must rotate in a direction opposite of arrow 252 against the bias of torsion spring 254 (FIG. 9). In this way, torsion spring 254 provides resistance against further rotation of pivot arm 240 while ensuring that measuring wheel outer circumferential surface 235 remains in constant rolling engagement with work piece edge 302.

When work piece edge 302 is properly positioned against the alignment fence section 16A, optional second deployable stop 92 senses work piece 300 when the work piece passes between the deployable stop's emitter 94 and reflector 96 and breaks the photoelectric beam produced by the emitter and causing the emitter to stop sending its signal to the CPU. The CPU interprets the interruption in the signal from optional second deployable stop 92 to mean that a cutting process is imminent, and that the operator has loaded the work piece on the power tool at a position to the right of the saw blade. Because the presence of the work piece interrupted the signal produced by second deployable stop 92, the CPU chooses to read and process only the output signal generated by optional second rotary encoder 231 (FIG. 3), which will correspond to the longitudinal distance traveled by the work piece in alignment area 19. The CPU will not read and process the output signal generated by first rotary encoder 31 when the signal from second deployable stop 92 is interrupted until the CPU resets itself at the completion of the cutting process, as described below. If the operator is using an embodiment of the power tool measuring device that does not include an optional second deployable stop 92, the operator may use keypad 75 (FIGS. 4 and 6) provided on display 38 to input information to the CPU that indicates that a work piece has been loaded on the right-hand side of power tool 12 and that the CPU should process cut length information received from second rotary encoder 231.

After the CPU recognizes an interruption in the signal from the first deployable stop, the CPU waits for an input signal from handle assembly proximity switch 80. As part of the pre-cut routine, the operator rotates handle assembly 18 in the direction of arrow 11 (FIG. 4) until saw blade 24 is placed in the cutting position. Referring to FIGS. 4 and 5B, once handle assembly 18 is fully rotated into the cutting position, proximity switch 80 senses the presence of flag 84 and sends a signal to the CPU that the handle assembly has been put in the cutting position. Once the CPU receives the signal from proximity switch 80, the CPU resets and holds the display 38 (FIG. 4) so that it shows a cut distance reading of zero. While handle assembly 18 is in the cutting position, the CPU holds the display reading at zero even though optional second rotary encoder 231 may generate output signal pulses because the CPU will recognize that the signal pulses generated by the rotary encoder are the result of the operator moving the work piece to a zero-point location. The operator places the work piece in zero-point location by sliding the work piece 300 along alignment fence 16 in the direction of arrow 500 until work piece end 306 engages the right-hand side of saw blade 24. In this way, the work piece is located such that the zero reading shown on display 38 properly reflects the fact that work piece end 304 is directly adjacent to the saw blade in the zero-point location.

After placing work piece 300 in the zero-point location, the operator then returns handle assembly 18 to its resting position, and proximity switch 80 no longer senses the presence of flag 84, causing an interruption in the signal produced by proximity switch 80. The CPU recognizes the interruption of the signal from proximity switch 80 as an indication that the operator has placed the work piece is the zero-point location and that cut measurement is about to begin. The CPU then actively receives and interprets output signal pulses generated by second rotary encoder 231. As the operator slides work piece 300 in the direction of arrow 500, the rolling engagement between measuring wheel outer circumferential surface 235 and work piece edge 302 forces second rotary encoder input shaft 232 (FIG. 11) to rotate. As the second rotary encoder input shaft rotates, output signal pulses are generated by the second rotary encoder 231 and transmitted to the CPU. The CPU reads and interprets the pulses from the second rotary encoder and processes the signal pulses into a display signal that represents the longitudinal movement of the work piece. The CPU then sends the display signal to display 38, where the signal is shown as a numerical representation of the length the operator has moved work piece from its original zero point location. The rolling engagement between second measuring wheel outer circumferential surface 235 and work piece edge 302 forces second rotary encoder input shaft 232 (FIG. 11) to rotate in response to movement of work piece edge 302 in direction of arrow 500.

As the operator slides the work piece in the direction of arrow 500, the power tool display 38 provides a precise indication of the cut distance. Once the operator is satisfied that the proper cut distance has been achieved, the operator activates the saw motor, and rotates handle assembly 18 in the direction of arrow 11 (FIG. 4) until the saw blade cuts completely through the work piece. As described above, rotation of the handle assembly into the cutting position causes proximity switch 80 to sense the presence of flag 84 (FIG. 5B) and send a signal to the CPU. The CPU recognizes the signal from proximity switch 80 as indicating that the cutting function is being performed. After the cut has been performed, the operator removes two cut pieces of the work piece from the miter saw 12 and returns handle assembly 18 to its resting position, thus removing flag 84 from proximity switch 80 and interrupting the signal sent from proximity switch 80 to the CPU. The CPU interprets this interruption as an indication that the cutting function has been completed, and the CPU holds the display 38 so that the display shows only distance measurement value shown on the display at the time that proximity switch 80 sensed flag 84 when the cut was performed. In this way, display 38 will continue to show the cut measurement from the prior cut, and CPU will not begin to read output signal pulses from either of the rotary encoders until the CPU resets itself when a new work piece is loaded into the alignment area and interrupts the signal from either deployable stop 90 or optional second deployable stop 90.

It should be recognized that the power tool measuring device described above does not account for the kerf of saw blade 24. The CPU may be programmed to provide a function that allows the operator to input the saw blade kerf into the CPU's memory each time a new saw blade is installed onto the saw motor output shaft. In an embodiment where display 38 is equipped with an input key pad 75 as shown in FIGS. 4 and 6, the operator may measure the saw blade kerf and then enter the measurement into the CPU's memory through key pad 75. When either of the first or second deployable stops is activated, the CPU recalls the kerf measurement value and subtracts it from the cut measurement relayed to the CPU from the rotary encoder the CPU has chosen to read. In this way, the cut measurement shown on display 38 is corrected to account for the saw blade kerf.

When the power tool measuring device is used with miter saws having a selectively rotatable table 20 (FIG. 1) that allows for angled or beveled cuts, a rotary encoder (not shown) may be installed at the table's point of rotation. This rotary encoder senses the rotation of table 20 at the table's point of rotation. When the operator rotates the table such that the saw blade is skewed from its normal position perpendicular to alignment fence 16 (FIG. 1), the rotary encoder sends a signal to the CPU that corresponds to the angular displacement of the table. Based upon the known saw blade kerf, the CPU uses simple geometric algorithms to correct the cut measurement to account for both saw blade kerf and the angle of the saw blade with respect to alignment fence 16.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A distance measuring device for use with a power tool having a base, an alignment fence, and an alignment area defined by the power tool base and the power tool alignment fence for receiving a work piece, said distance measuring device comprising:
    a first electronic rotary encoder having an input shaft, said first electronic rotary encoder being proximate to the alignment area and producing a first output signal that corresponds to a longitudinal motion of the work piece within the alignment area when an outer surface of the work piece simultaneously slidably engages the power tool base and the power tool alignment fence, wherein said first output signal corresponds to the rotation of said first electronic rotary encoder input shaft;
    a first distance measuring wheel fixed on said first electronic rotary encoder input shaft and having an outer circumferential surface in rolling engagement with an outer surface of the work piece;
    a second electronic rotary encoder having an input shaft, said second electronic rotary encoder being proximate to the alignment area and producing a second output signal that corresponds to a longitudinal motion of the work piece within the alignment area when an outer surface of the work piece simultaneously slidably engages the power tool base and the power tool alignment fence, wherein said second output signal corresponds to the rotation of said second electronic rotary encoder input shaft;
    a second distance measuring wheel fixed on said second electronic rotary encoder input shaft and having an outer circumferential surface in rolling engagement with an outer surface of the work piece;
    a first support bracket;
    a second support bracket;
    a first arm having a first end rigidly attached to said first electronic rotary encoder and a second end pivotally attached to said first support bracket;
    a second arm having a first end rigidly attached to said second electronic rotary encoder and a second end pivotally attached to said second support bracket;
    a processor that receives said first and second output signals, determines a longitudinal distance traveled by said work piece within the alignment area from said first and second output signals, and outputs a third signal that corresponds to the longitudinal distance traveled by the work piece within the alignment area; and
    an electronic digital display receiving said third signal from said processor and providing an alpha-numeric representation of the distance traveled by the work piece within the alignment area;
    wherein the power tool alignment fence comprises:
        a first section disposed distal from a left-hand side of the power tool;
        a second section disposed proximate to a left-hand side of the power tool;
        a third section disposed proximate to a right-hand side of the power tool; and
        a fourth section disposed distal from a right-hand side of the power tool;
    wherein said first support bracket is rigidly attached to a rear surface of the first alignment fence section and disposed such that said first arm first end extends so as to locate said first measuring wheel between the power tool alignment fence first section and the power tool alignment fence second section; and
    wherein said second support bracket is rigidly attached to a rear surface of the fourth alignment fence section and disposed such that said second arm first end extends so as to locate said second measuring wheel between the power tool alignment fence third section and the power tool alignment fence fourth section.

2. The measuring device according to claim 1 wherein the power tool is a miter saw.

3. The measuring device according to claim 1:
    wherein each of said first and second distance measuring wheels have an outer circumference of about 11.25 inches;
    wherein each of said first and second rotary encoders generate a signal pulse for each about one degree angular rotation of each of said input shafts and sends each said signal pulse to said processor; and wherein said processor comprises a central processing unit that receives each said signal pulse and determines a longitudinal distance traveled by the work piece within the alignment area from said signal pulses.

4. The measuring device according to claim 1 wherein said electronic digital display comprises a key pad for inputting data, said digital display sending an electronic signal to said processor corresponding to said data input on said digital display key pad.

5. The measuring device according to claim 1 further comprising at least one deployable stop attached to the power tool base, said at least one deployable stop sending an indication to said processor when an operator loads the work piece into the power tool alignment area such that said deployable stop senses the presence of the work piece in the alignment area.

6. A power tool comprising:
a base;
an alignment fence;
an alignment area defined by said power tool base and said power tool alignment fence for receiving a work piece; and
a distance measuring device comprising:
a first electronic rotary encoder having an input shaft, said first electronic rotary encoder being proximate to said alignment area and producing a first output signal that corresponds to a longitudinal motion of the work piece within said alignment area when an outer surface of the work piece simultaneously slidably engages said power tool base and said power tool alignment fence, wherein said first output signal corresponds to the rotation of said first electronic rotary encoder input shaft;
a first distance measuring wheel fixed on said first electronic rotary encoder input shaft and having an outer circumferential surface in rolling engagement with an outer surface of the work piece;
a second electronic rotary encoder having an input shaft, said second electronic rotary encoder being proximate to said alignment area and producing a second output signal that corresponds to a longitudinal motion of the work piece within said alignment area when an outer surface of the work piece simultaneously slidably engages said power tool base and said power tool alignment fence, wherein said second output signal corresponds to the rotation of said second electronic rotary encoder input shaft;
a second distance measuring wheel fixed on said second electronic rotary encoder input shaft and having an outer circumferential surface in rolling engagement with an outer surface of the work piece;
a first support bracket;
a second support bracket;
a first arm having a first end rigidly attached to said first electronic rotary encoder and a second end pivotally attached to said first support bracket;
a second arm having a first end rigidly attached to said second electronic rotary encoder and a second end pivotally attached to said second support bracket;
a processor that receives said first and second output signals, determines a longitudinal distance traveled by said work piece within said alignment area from said first and second output signals, and outputs a third signal that corresponds to the longitudinal distance traveled by the work piece within the alignment area; and
an electronic digital display receiving said third signal from said processor and providing an alpha-numeric representation of the distance traveled by the work piece within said alignment area;

wherein said power tool alignment fence comprises:
a first section disposed distal from a left-hand side of said power tool;
a second section disposed proximate to a left-hand side of said power tool;
a third section disposed proximate to a right-hand side of said power tool; and
a fourth section disposed distal from a right-hand side of said power tool;
wherein said first support bracket is rigidly attached to a rear surface of said first alignment fence section and disposed such that said first arm first end extends so as to locate said first measuring wheel between said power tool alignment fence first section and said power tool alignment fence second section; and
wherein said second support bracket is rigidly attached to a rear surface of said fourth alignment fence section and disposed such that said second arm first end extends so as to locate said second measuring wheel between said power tool alignment fence third section and said power tool alignment fence fourth section.

7. The power tool according to claim 6 wherein the power tool is a miter saw.

8. The power tool according to claim 6:
wherein each of said first and second distance measuring wheels have an outer circumference of about 11.25 inches;
wherein each of said first and second rotary encoders generate a signal pulse for each about one degree angular rotation of each of said input shafts and sends each signal pulse to said processor; and
wherein said processor comprises a central processing unit that receives each said signal pulse and determines a longitudinal distance traveled by the work piece within said alignment area from said signal pulses.

9. The power tool according to claim 6 wherein said electronic digital display comprises a key pad for inputting data, said digital display sending an electronic signal to said processor corresponding to said data input on said digital display key pad.

10. The power tool according to claim 6 further comprising at least one deployable stop attached to said power tool base, said at least one deployable stop sending an indication to said processor when an operator loads the work piece into said power tool alignment area such that said deployable stop senses the presence of the work piece in said alignment area.

11. A distance measuring device for use with a power tool having a base, an alignment fence, and an alignment area defined by the power tool base and the power tool alignment fence for receiving a work piece, said distance measuring device comprising:
a first measuring sensor proximate to the alignment area that produces a first signal that corresponds to a longitudinal motion of the work piece within the alignment area when an outer surface of the work piece simultaneously slidably engages the power tool base and the power tool alignment fence;
a second measuring sensor proximate to the alignment area that produces a second signal that corresponds to a longitudinal motion of the work piece within the alignment area when an outer surface of the work piece simultaneously slidably engages the power tool base and the power tool alignment fence;
a processor that receives said first and second signals, determines a longitudinal distance traveled by the work piece within the alignment area from said first or second signal, and outputs a third signal that corresponds to the longitudinal distance traveled by the work piece within the alignment area, said third signal being based on a selected one of said first or second signals; and a display receiving said third signal from said processor and providing an alpha-numeric representation of the distance traveled by the work piece within the alignment area.

12. The measuring device according to claim 11 wherein the power tool is a miter saw.

13. The measuring device according to claim 11 wherein each of said measuring sensors comprises a distance measuring wheel having an outer circumference surface in rolling engagement with the work piece outer surface.

14. The measuring device according to claim 11 where each of said measuring sensors further comprises an electronic rotary encoder and a distance measuring wheel, said electronic rotary encoder having an input shaft and producing an output signal that corresponds to the rotation of said input shaft, and said measuring wheel being fixed on said input shaft.

15. The measuring device according to claim 14:
wherein each of said distance measuring wheels has an outer circumference of about 11.25 inches;
wherein each of said electronic rotary encoders generates a signal pulse for each about one degree angular rotation of its corresponding input shaft and sends each said pulse to said processor; and
wherein said processor comprises a central processing unit that receives said signal pulses and determines a longitudinal distance traveled by the work piece within the alignment area from said signal pulses.

16. The measuring device according to claim 11 wherein said processor comprises a central processing unit.

17. The measuring device according to claim 11 wherein said display comprises an electronic digital display.

18. The measuring device according to claim 17 wherein said display further comprising a key pad for inputting data, and wherein said display sends an electronic signal to said processor corresponding to the data input on said digital key pad.

19. A power tool comprising:
a base;
an alignment fence;
an alignment area defined by said power tool base and said power tool alignment fence for receiving a work piece; and
a distance measuring device comprising:
a first measuring sensor proximate to said alignment area that produces a first signal that corresponds to a longitudinal motion of the work piece within said alignment area when an outer surface of the work piece simultaneously slidably engages said power tool base and said power tool alignment fence;
a second measuring sensor proximate to said alignment area that produces a second signal that corresponds to a longitudinal motion of the work piece within said alignment area when an outer surface of the work piece simultaneously slidably engages said power tool base and said power tool alignment fence;
a processor that receives said first and second signals, determines a longitudinal distance traveled by the work piece within said alignment area from said first or second signal, and outputs a third signal that corresponds to the longitudinal distance traveled by the work piece within said alignment area, said third signal being based on a selected one of said first or second signals; and
a display receiving said third signal from said processor and providing an alpha-numeric representation of the distance traveled by the work piece within said alignment area.

20. The power tool according to claim 19 wherein said power tool is a miter saw.

21. The power tool according to claim 19 wherein each of said measuring sensors comprises a distance measuring wheel having an outer circumference surface in rolling engagement with the work piece outer surface.

22. The power tool according to claim 19 where each of said measuring sensors further comprises an electronic rotary encoder and a distance measuring wheel, said electronic rotary encoder having an input shaft and producing an output signal that corresponds to the rotation of said input shaft, and said measuring wheel being fixed on said input shaft.

23. The power tool according to claim 22:
wherein each of said distance measuring wheels has an outer circumference of about 11.25 inches;
wherein each of said electronic rotary encoders generates a signal pulse for each about one degree angular rotation of its corresponding input shaft and sends each said pulse to said processor; and
wherein said processor comprises a central processing unit that receives said signal pulses and determines a longitudinal distance traveled by the work piece within said alignment area from said signal pulses.

24. The power tool according to claim 19 wherein said processor comprises a central processing unit.

25. The power tool according to claim 19 wherein said display comprises an electronic digital display.

26. The power tool according to claim 25 wherein said display further comprising a key pad for inputting data, and wherein said display sends an electronic signal to said processor corresponding to the data input on said digital key pad.

* * * * *